United States Patent [19]
Rosheim

[11] Patent Number: 6,038,940
[45] Date of Patent: Mar. 21, 2000

[54] CONTROLLED ROBOTIC CARRIER

[75] Inventor: Mark E. Rosheim, St. Paul, Minn.

[73] Assignee: Ross-Himes Designs, Incorporated, Minneapolis, Minn.

[21] Appl. No.: 09/208,784

[22] Filed: Dec. 10, 1998

[51] Int. Cl.$^7$ .............................. G05G 11/00; G09B 9/08
[52] U.S. Cl. ................................ 74/490.11; 74/490.07; 434/55; 434/58
[58] Field of Search ................ 74/471 XY, 490.07; 434/55, 58; 472/130

[56] References Cited

U.S. PATENT DOCUMENTS

| | | |
|---|---|---|
| 125,880 | 4/1872 | Clemens . |
| 2,988,904 | 6/1961 | Mazziotti ..................................... 64/21 |
| 3,075,368 | 1/1963 | Hulse ........................................... 64/20 |
| 3,477,249 | 11/1969 | Culver ......................................... 64/21 |
| 4,819,496 | 4/1989 | Shelef ....................................... 74/479 |
| 5,545,040 | 8/1996 | Lu ............................................ 434/58 |
| 5,556,242 | 9/1996 | Sheldon et al. ......................... 409/132 |
| 5,605,462 | 2/1997 | Denne ...................................... 434/55 |
| 5,656,905 | 8/1997 | Tsai .................................... 318/568.21 |
| 5,715,729 | 2/1998 | Toyama et al. ....................... 74/490.03 |
| 5,752,834 | 5/1998 | Ling ......................................... 434/58 |

OTHER PUBLICATIONS

"On the Development of the Agile Eye" by C. Gosselin et al., *IEEE Robotics & Automation* magazine, Dec. 1996.
P. 166 of *Machine Design;,* Jun. 21, 1973.
P. 291 of *Mechanisms & Mechanical Devices Sourcebook* by N. Chironis, entitled "Interwining links Produce true Constant–Motion Universal", published by McGraw–Hill, Inc. ©1991.
Pp. 124 through 127 and 162 and 63 from *Robot Wrist Actuators* by Mark E. Rosheim, published by John Wiley & Sons, Inc. ©1989.
Cover page and pp. 90 and 92 from Dec. 1994 issue of *Discover* magazine.
Pp. 131 through 133 is an excerpt entitled "Tetrabot" from a book entitled *Robot Evolution* by Mark E. Rosheim., published by John Wiley & Sons, Inc. ©1994.

"Constant Velocity Shaft Couplings" by K. H. Hunt, *Journal of Engineering for Industry,* May 1973.
IEEE, "A Pantograph Linkage Parallel Platform Master Hand Controller for Force Reflection", by Long & Collins, dated May 1992.
IEEE, "Kinematic Analysis of a Novel 6–DOF Parallel Manipulator", by Cleary & Brooks, ©1993.
"A Coarse–Fine Approach to Force Deflecting Hand Controller Design" By Stocco & Salcudean, Apr. 1996.
IEEE, "Hexa–A Fast Six–DOF Fully–Parallel Robot", by Piessot Davchez, Fournier, ©1991.
IEEE, "A New Analytical System Applying 6 DOF Parallel Link Manipulator for Evacuating Motion Sensation", Mimura & Funalaski, ©1995.

*Primary Examiner*—David A. Bucci
*Assistant Examiner*—Colby Hansen
*Attorney, Agent, or Firm*—Kinney & Lange, P.A.

[57] ABSTRACT

A controlled mechanical carrier motion system comprising a base support, a pivot holder and a plurality of pivoting links with the pivoting links rotatably coupled to both to members of the pivot holder and to either the base support or to a corresponding one of a plurality of force imparting members, or both, to rotate about axes which extend in different directions for each of these rotatable couplings in a link, typically in accord with specific geometrical arrangements, and in different directions from similar axes in another of such links. The pivot holder can serve as a further base for a second similar controlled mechanical carrier motion system, or the pivot holder can be linked with a second plurality of pivoting links to a manipulable support in an output structure in which at least a portion of a control system, capable of directing the force imparting members to impart selected forces, or of at least a portion of an information presentation system, capable of providing information in a selected form. Such a manipulable support can be a part of, or support for, further such systems, or both, or it may support a platform on which the control system or the information presentation system or both are supported. Such systems can incorporate a variety of force imparting members to control movements of various ones of the pivoting links or pivot holder members. The pivoting links can be bent, and the pivot holder members can be hinged.

46 Claims, 4 Drawing Sheets

CONTROLLED ROBOTIC CARRIER

CROSS-REFERENCE TO RELATED APPLICATIONS

Reference is hereby made to earlier filed applications by Mark E. Rosheim having application Ser. No. 08/951,555, filed Oct. 16, 1997 entitled "Robotic Manipulator", and application Ser. No. 08/816,359, filed Mar. 13, 1997 entitled "Robotic Manipulator", and each is incorporated herein by reference.

BACKGROUND OF THE INVENTION

The present invention relates to controlled motion mechanical members used as a mechanical manipulator as the basis for a controllable platform and, more particularly, to a motion controllable mechanical manipulator which can be formed from repeated use of components of relatively few component types.

A strong desire for increased automation in the workplace, and a desire to provide new experiences in centers of entertainment and to increase the use of animated figures depicting animals, humans or other characters in such entertainment and in other situations, along with an increased ability to control such mechanical manipulators, has led to substantial efforts in the development of robotics. As a result, substantial advances have occurred in many aspects of robotics.

Perhaps the most widely used controlled component in robotic systems is a mechanical manipulator, that portion of a robot used to change the position of orientation of selected objects engaged or supported by that manipulator. In many instances, such mechanical manipulators are desired to have capabilities similar to those of the human wrist or shoulder, that is, exhibiting two or more degrees of freedom of motion.

Although a number of such mechanical manipulators have been developed which to a greater or lesser degree achieve some of these desires therefor, most have been relatively complicated devices requiring complicated components and difficult assembly procedures or both. Many, in addition, represent compromises in having relatively limited range, or singularities within the ranges, or other limitations in performance. Thus, there is a strong desire for a mechanical manipulator which can, under control of the user, position objects, even supported objects carrying the user, anywhere over at least a more or less hemispherical surface portion, and in some instances to choose a different such surface further from or closer to the manipulator base, without any singularities in the operation of the device in this range, and which can be made both reliably and inexpensively.

BRIEF SUMMARY OF THE INVENTION

The present invention provides a controlled mechanical carrier motion system comprising a base support, a pivot holder and a plurality of pivoting links. The pivoting links are rotatably coupled to both to members of the pivot holder and to either the base support or a corresponding one of a plurality of force imparting members to rotate about axes which extend in different directions for each of these rotatable couplings in a link typically in accord with specific geometrical arrangements, and in different directions from similar axes in another of such links. Alternatively, the pivoting links are rotatably coupled to both the base support and to a corresponding one of a plurality of force imparting members. The pivot holder can serve as a further base for a second similar controlled mechanical carrier motion system, or the pivot holder can be linked with a second plurality of pivoting links to a manipulable support in an output structure in which at least a portion of a control system, capable of directing the force imparting members to impart selected forces, or of at least a portion of an information presentation system, capable of providing information in a selected form. Such a manipulable support can be a part of, or support for, further such systems, or both, or it may support a platform on which the control system or the information presentation system or both are supported. These systems can be supported on rotatable mounting arrangements at the base supports or pivot holders.

Such systems can incorporate a variety of force imparting members to control movements of various ones of the pivoting links or pivot holder members. Such members may be electric motors or linear actuators, and may be connected to the system directly or through drive trains and the like.

The pivoting links may be bent to allow the positions of the base and manipulable supports to be closer to one another. Pivot holders having hinged portions with one portion rotatably connected to a first plurality pivoting link and the other portion rotatably connected to a second plurality pivoting link provides a capability controlling the separation between the base and manipulable support.

DETAILED DESCRIPTION

Figure 1:
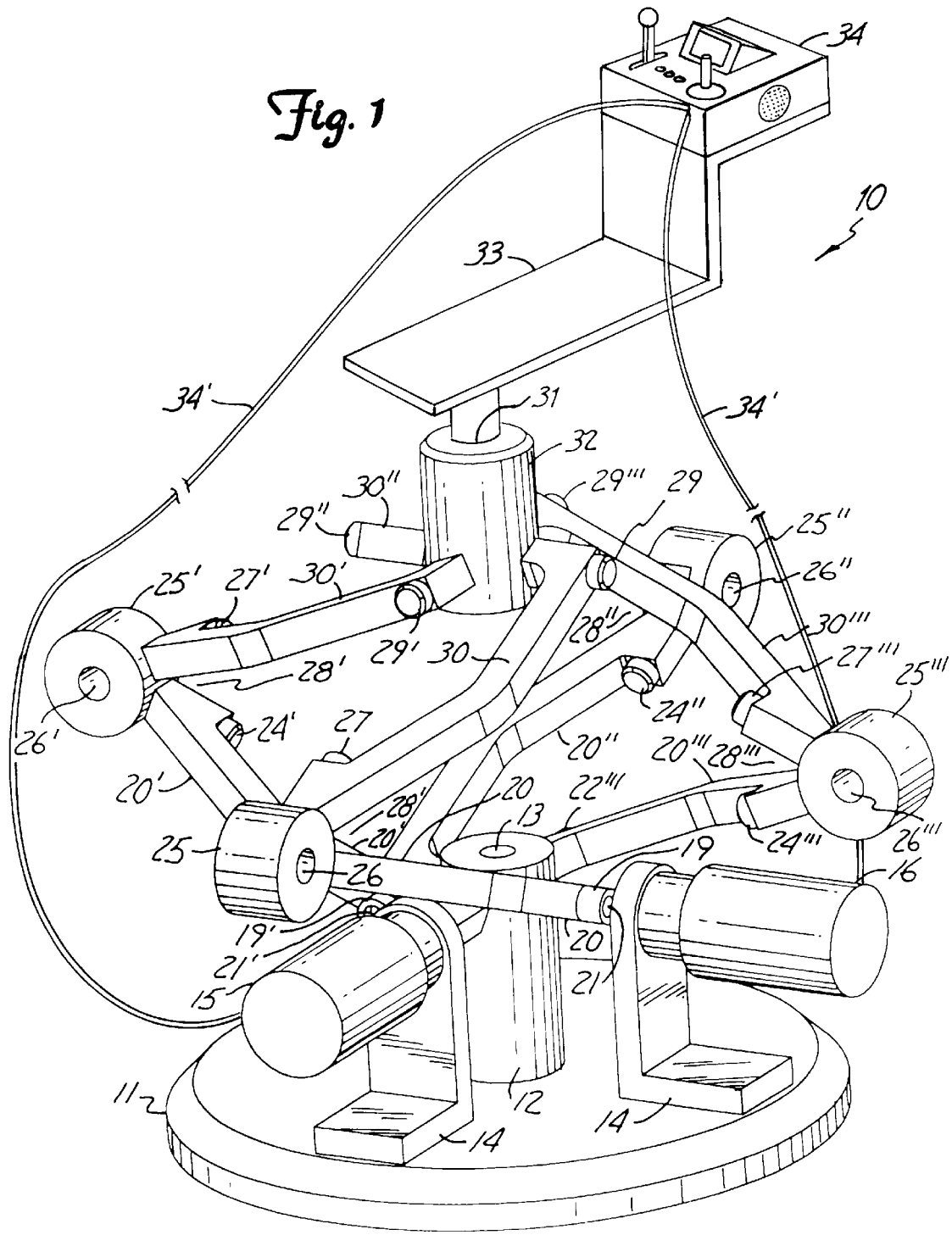
FIG. 1 shows a perspective view of an embodiment of the present invention.

FIG. 1 shows a first embodiment of a controlled mechanical carrier motion system, 10, which can have a very large output traveling range in various configurations over which it is free of singularities, and which is operated by various force imparting devices directly or through various drive trains. Carrier 10 formed by use of mechanical manipulators described in earlier filed copending applications by Mark E. Rosheim entitled "Robotic Manipulator" having Ser. No. 08/816,359, and entitled "Robotic Manipulator" having Ser. No. 08/951,559 both of which are assigned to the same assignee as is the present application and hereby incorporated herein by reference.

FIG. 1 shows a perspective view of carrier 10. Carrier 10 is positioned on a mounting arrangement, 11, which in some uses contains therein an electric motor arrangement, unseen in these figures, which can rotate mounting arrangement 11 in either the clockwise or counterclockwise direction as selected by the user to thereby carry the remainder of carrier 10 correspondingly with it in these directions. Directly supported on mounting arrangement 11 is a lower base support, 12, shown as truncated cylindrical shell structure though different geometrical shapes can be used. Support 12 has an opening, 13, extending vertically in these figures along the axis of radial symmetry for support 12 to parallel the outer curved sides thereof. Opening 13 extends through support 12 and from there through mounting arrangement 11 along the axis about which it is capable of rotating carrier 10 so as to be capable of permitting some desired means extend therethrough such as electrical wiring, optical fibers or some mechanical arrangement, or some combination thereof.

Also shown supported directly on mounting arrangement 11 are a pair of rotary actuator support pedestals, 14, each of which is shown supporting an electric motor along with the direct mechanical interconnection between that electric motor and the remaining portions of carrier 10. That is, a pair of electric motors, 15 and 16, are each mounted in the corresponding one of pedestals 14 using screws, and have motor controllers built therein though not separately shown. Electric motor 16 has a shaft extending from the rotor thereof which is directly affixed in an opening of a crank arm, 19. This crank arm is directly affixed to a pivoting link, 20, by a further screw, 21. Rotation by the rotor in electric motor 16 clockwise or counterclockwise causes its shaft to rotate in a corresponding angular direction which in turn causes crank arm 19 to correspondingly rotate.

Such rotations by crank arm 19 forces pivoting link 20 to in turn rotate one way or the other about a pin, 22, (not seen) on a pair of bearings around a rotation axis extending through that pin that is more or less perpendicular to the length of link 20. This shaft is directly affixed in an opening in lower base support 12, and could be a pivot screw rather than a pin or be part of a shackle. Such a pivot screw is threaded at the end thereof opposite the screw head only a relatively short distance in from that end to permit its being screwed firmly into base support 12 but only a fixed distance therein to assure a selected length of the screw is exposed outside support 12. The surface of this exposed portion of the screw from support 12 to the screw head is smooth especially if no bearing or bushing is used between this screw and pivoting link 20 (lubrication at the least would be likely to be used in this situation). Typically, there will be used either a bearing set or a bushing between pin or pivot screw 22 and pivoting link 20.

An identical electric motor rotational drive system for forcing rotational motion of another pivoting link is provided in connection with electric motor 15. As seen in FIG. 1, a crank arm, 19', is affixed to the rotor shaft of motor 15 (this mechanical connection is unseen in FIG. 1) with the other end of crank arm 19' being affixed by screw, 21', to a further pivoting link, 20', rotatably connected to lower base support 12. Thus, again, rotation of the rotor of electric motor 15 in either the clockwise or counterclockwise direction forces pivoting link 20' to correspondingly rotate in either a clockwise or counterclockwise direction. Pivoting link 20' can rotate on bearings about a pin or pivot screw, 22', not seen in this figure, affixed to lower base support 12, and again around an axis extending therethrough more or less perpendicular to the length of link 20'.

Pivoting links 20 and 20' are two pivoting links in a plurality of lower pivoting links in carrier 10, this lower plurality further including two other pivoting links, 20" and 20'". These last two pivoting links are each capable of rotating on bearings about a corresponding one of pins or pivot screws, 22" and 22'", respectively, with the corresponding axis of rotation extending therethrough substantially perpendicular to the length of links 20" and 20'". Pins or pivot screws 22" and 22'" are affixed to base support 12, and are seen in part in FIGS. 1 and 2. Each of pins or pivot screws 22, 22', 22" and 22'" is affixed to base support 12 such that the corresponding one of the plurality of lower pivoting links rotatably coupled to base support 12 thereby rotates about an axis therethrough that intersects, and is perpendicular to, the axis of radial symmetry of support 12, with these rotation axes being separated from adjacent ones by equal angles measured about the symmetry axis, here 90°.

The lower plurality of pivoting links 20, 20', 20" and 20'", in addition to each having an end thereof being rotatably connected to base support 12 as described above, also each have the opposite end thereof rotatably connected by four further pins or pivot screws, 24, 24', 24" and 24'", to a pivot holder comprising four individual and separated pivot holder members, 25, 25', 25" and 25'", which have no direct connections therebetween. Each of these pivot holder members is formed as a truncated portion of a cylindrical shell about an axis of radial symmetry, and each is shown with a corresponding one of a set of holes, 26, 26', 26" and 26'", extending therethrough parallel to the outer curve surface thereof along the shell axis of radial symmetry. The outer curved surface of each such pivot holder member shell is pierced by its corresponding one of pins or pivot screws 24, 24', 24" and 24'" in its being affixed therein. Each such pin or pivot screw has the end of the corresponding one of the lower plurality of pivoting links 20, 20', 20" and 20'" coupled thereto so as to be able to rotate thereabout on bearings with the axis of rotation of this link about such pin or pivot screw being more or less parallel to the length of the link and intersecting the shell axis of radial symmetry.

The axis of rotation of each of the lower plurality of pivoting links 20, 20', 20" and 20'" through a corresponding one of pins or pivot screws 24, 24', 24" and 24'" in being rotatably coupled to a corresponding one of pivot holder members 25, 25', 25" and 25'", and the axis of rotation of each of these links through a corresponding one of pins or pivot screws 22, 22', 22" and 22'" in being rotatably coupled to base support 12 are, in each link instance, perpendicular to planes that intersect one another at substantially right angles. These rotation axes for each of these links are also oriented in directions differing from those in an adjacent link, i.e. the next link thereafter around base support 12. This allows pivot holder members 25, 25', 25" and 25'" to be moved by the corresponding pivoting links substantially with respect to base support 12, but for the same length links these pivot holder members will always be in a plane common thereto, and will move about a circle in such planes.

Although pivot holder members 25, 25', 25" and 25'" are shown in these figures as truncated portions of cylindrical shells, this shape is not required but instead other geometrical shapes could be used. One such shape clearly could be just the inside half these cylindrical shells which could result from dividing each of them vertically along the axis of radial symmetry. Another alternative would be a triangular block having a side thereof substantially perpendicular to the axis of rotation about which the pivoting link from the lower plurality thereof can rotate in being rotatably coupled thereto by its corresponding pin or pivot screw.

Carrier 10 is shown in these figures having a further upper plurality of pivoting links. A corresponding one of this plurality is rotatably coupled to each of pivot holder members 25, 25', 25" and 25'" by a corresponding one of a further set of pins or pivot screws, 27, 27', 27" and 27'", again which pierce the outer curved shell surface of that member in being affixed therein. The axis of rotation of the corresponding one of this upper plurality of pivoting links, in being able to rotate about its pin or pivot screws 27, 27', 27" and 27'", is directed so as to be more or less parallel to the length of the link and to intersect the axis of radial symmetry of the corresponding one of pivot holder members 25, 25', 25" and 25'". As a result, there is a corresponding one of a set of angles, 28, 28', 28" and 28'", of a selected angular magnitude between the axis of rotation of the pivoting link from the lower plurality thereof rotatably connected to each pivot holder member and the axis of rotation of the one of the upper plurality of pivoting links also rotatably connected thereto as shown in these figures. The selection of the magnitude of each of angles 28, 28', 28" and 28'" effects the capabilities of carrier 10 as will be described below. For any selected angle, increasing the diameter of the outer surface of the truncated cylindrical shell serving as pivot holder members 25, 25', 25" and 25'" will result in shortening the length of the pivoting links rotatably connected thereto from both the upper and the lower pluralities thereof.

Another set of pins or pivot screws, 29, 29', 29" and 29'", are each used at the opposite end of a corresponding one of the upper plurality of pivoting links, 30, 30', 30" and 30'". If carrier 10 is constructed symmetrically above and below a plane including the axes of radial symmetry of each of pivot holder members 25, 25', 25" and 25'" (a horizontal plane in FIG. 2), i.e., angles 28, 28', 28" and 28'" in these figures being bisected by such a common plane, the upper plurality of pivoting links 30, 30', 30" and 30'" can be identical in construction with each other and with each of the lower plurality of pivoting links 20, 20', 20" and 20'". Although this is a significant economic factor in manufacturing significant numbers of joint or carrier 10, this symmetry is not required for successful operation of such carriers. However, the nature of the positioning of the output structure in such carriers for a given rotation of the rotor shafts of motors 15 or 16 will change with differences in the portions of angles 28, 28', 28" and 28'" above and below the horizon. Also, the lengths of pivoting links in the upper and lower pluralities thereof need not all be the same to have successful operation of carrier 10 but, again, the pattern of the positioning of this output structure will change depending on such differences.

The output structure which is controlled in carrier 10 by motion of the rotors of electric motors 15 and 16 has a hole, 31, provided therethrough to form a cylindrical shell resulting in a manipulable support, 32, forming an upper base for this structure. A platform, 33, has a support shaft as a part thereof extending into hole 31, and affixed therein so that motions of manipulable support 32 will result in corresponding motions of platform 33. Again, geometrical shapes other than such a cylindrical shell can be used for manipulable support 32, and again various items can be extended through opening 31 such as electrical wiring or optical fibers or, in this output situation, a further mechanical device supported on support 32, or some combination of such features or other alternatives assuming a corresponding opening is provided in the support shaft of platform 33. One possibility is that such wiring or fibers could extend through opening 31, and the corresponding opening in the support shaft of plat form 33, to connect the motor controllers built into motors 15 and 16 and a user controller and display, 34, mounted on platform 33 so that the user can ride that platform during its use while operating controller 34 to result in providing control signals therefrom to control, at least in part, the operation of motors 15 and 16. For purposes of clarity, such wires or fibers, 34', are not shown in FIG. 1 extending through such openings in connecting motors 15 and 16 with controller 34 but, instead, are shown as direct connections, and the necessary electrical power connections are not shown. The user or rider has hand control input devices, 34", mounted on the arms of chair 33' to provide control input signals to operating controller 34 over further ones of wires or fibers 34' again shown directly connected therebetween, and an associated display with loudspeakers, 34'", for receiving information.

Each of pivoting links 30, 30', 30" and 30'" in the upper plurality thereof is rotatably coupled by a corresponding one of pins or pivot screws 29, 29', 29" and 29'" to manipulable support 32 which could be part of a shackle. Here too, each of pins or pivot screws 29, 29', 29" and 29'" is affixed to support 32 such that the corresponding one of the plurality of upper pivoting links rotatably coupled to manipulable support 32 thereby rotates about an axis therethrough that intersects, and is perpendicular to, the axis of radial symmetry of support 32, with these rotation axes being separated from adjacent ones by equal angles measured about the symmetry axis, here again 90° because of the presence of four pivot links. Although the rotation axes of the pivoting links at the rotary couplings thereof to supports 12 and 32 are described as making equal angles with adjacent ones thereof as they occur about those supports, these angles need not be identical about either support, nor identical about one support with those about the other, to be able to position support 32 over a substantial angular range, though providing substantially such identities is often convenient.

The axis of rotation of such a one of pivoting links 30, 30', 30" and 30'" in the upper plurality thereof about its pin or pivot screw coupling it to support 32 extends through that pin or screw more or less perpendicular to the direction of the length of that link, and substantially parallel to the axis of rotation about the pin or pivot screw rotatably coupling the corresponding one of pivoting links 20, 20', 20" and 20'" in the lower plurality thereof to base support 12. The correspondence here between upper and lower plurality pivoting links is established by each being coupled to the same one of pivot holder members 25, 25', 25" and 25'". Again here as for links in the lower plurality thereof, the axis of rotation of a pivot link 30, 30', 30" or 30'" in the upper plurality thereof about its corresponding one of pins or pivot screws 27, 27', 27" or 27'" is substantially perpendicular to a plane which intersects at substantially right angles that plane which is substantially perpendicular to the axis of rotation of that link about its corresponding one of pins 29, 29', 29" or 29'".

The various structural components of joint or carrier 10 described in connection with FIG. 1 above are typically formed of a metal or metals, or alloys thereof, appropriate for the intended use, i.e. perhaps stainless steel for a medical use, aluminum or titanium where weight is a primary concern, etc. Many or all of these components could molded polymeric materials instead.

Figure 2:
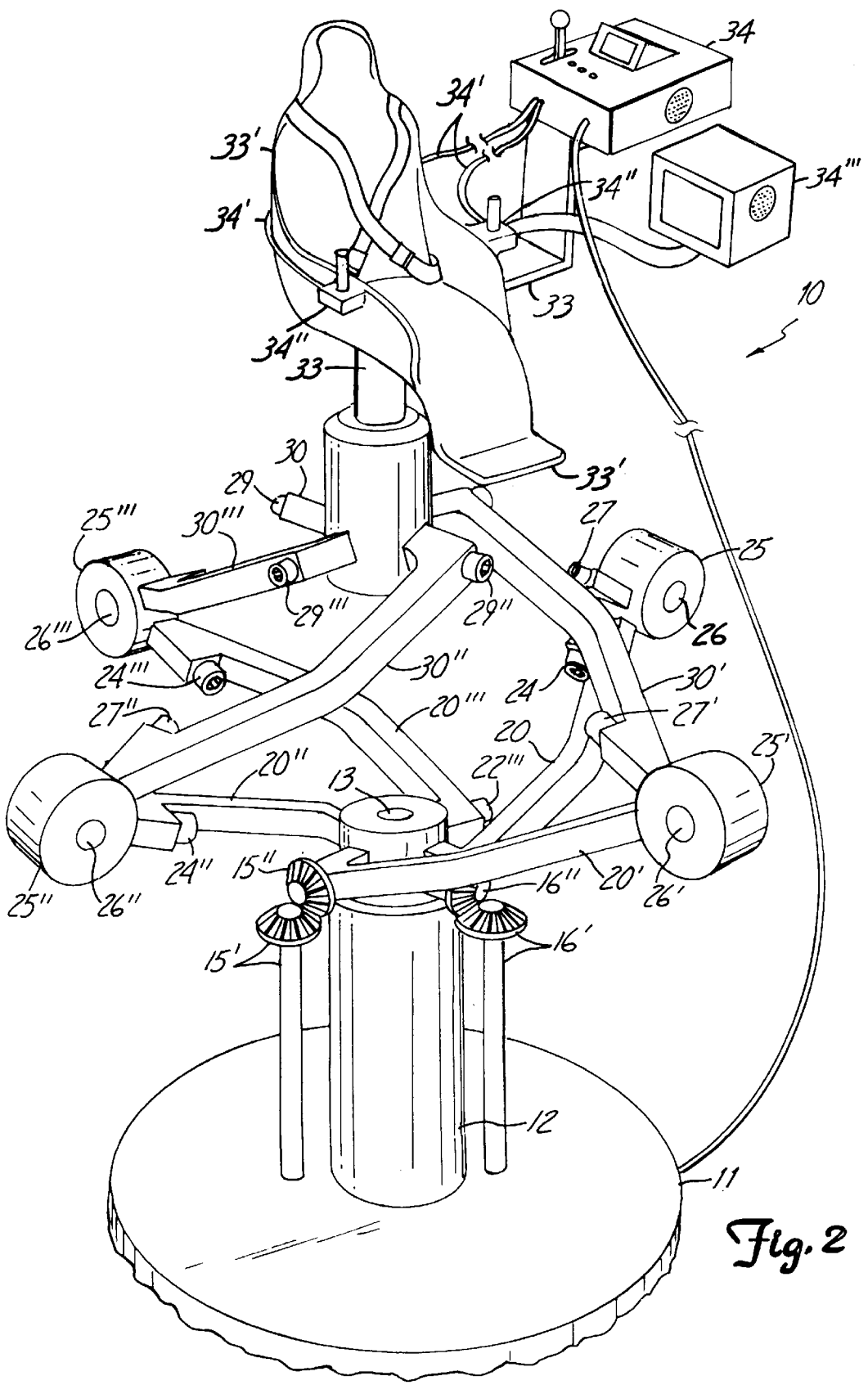
FIG. 2 shows a perspective view of an alternative embodiment of the present invention.

In a further alternative, a perspective view is shown in FIG. 2 that corresponds to the perspective view shown in FIG. 1. A change in the configuration of the version of joint or carrier 10 shown in FIG. 2 from the configuration shown in FIG. 1 is based on the reversal in the earlier choice of which link in a combination of two corresponding pivoting links rotatably coupled to a pivot holder member is chosen to extend from that member to base support 12 and to manipulable support 32, and on which sides of the supports 12 and 32 it is placed. That is, the pivoting links extending from each pivot holder member which were in the lower plurality of pivoting links in the example shown in FIG. 1 can be viewed as now being in the upper plurality in FIG. 2, and vice versa, and so as to be on opposite sides of the supports rather than both on the same side. This change causes no limitation in the capabilities of carrier 10 for positioning manipulable support 32 and platform 33 in any angular position desired. That is, manipulable support 32 can be placed in a particular desired angular position whether the configuration is that shown in FIG. 1, or in the alternative configuration shown in FIG. 2, resulting from particular patterns of assembling pivoting links to pivot holder members, and to base and manipulable supports 12 and 32. The designations used for the pivoting links in the upper and lower pluralities thereof in FIGS. 1 and 2 have not been changed because of the inconsequentiality of these assembly differences.

Another change in configuration of joint or carrier 10 is shown in FIG. 2 from the configuration shown in FIG. 1, that change being the substitution of a motor driven, gear based drive train for directing motion of pivoting links in the lower plurality thereof rather than the direct connection of electric motors 15 and 16 to these links for that purpose. Thus, electric motor 15 is now carried in mounting arrangement 11 in FIG. 2, and unseen in these figures, but an extension of its rotor shaft with a bevel gear affixed to the end thereof can be seen in these figures extending upward through mounting arrangement 11. This extended shaft and bevel gear affixed thereto form a combination together designated 15'. A further bevel gear, 15", engaged with this first bevel gear, is affixed to pivoting link 20' about pin or pivot screw 22' so this link can again be rotated clockwise or counterclockwise about pin or pivot screw 22' by rotation of the rotor shaft of unseen electric motor 15. Similarly, motor 16 is unseen in these figures in being supported under mounting arrangement 11, but an extension of its rotor shaft together with a bevel gear affixed on the end thereof as a combination, 16', engages a further bevel gear, 16", affixed to pivoting link 20 of the lower plurality of pivoting links about pin or pivot screw 22. Here too, rotation of the shaft of electric motor 16 either clockwise or counter clockwise allows rotating pivoting link 20 upward or downward about pin or pivot screw 22.

Finally, platform 33 is shown in FIG. 2 supporting a chair, 33', for the user to sit in while riding that platform during its use and work with operating controller and display 34. If platform 33 is serving as a work platform during such use to position the user at a selected position, the entire control capability for motors 15 and 16 in their moving of the platform can be provided at controller 34 or hand controllers 34" if desired along with selected information. Otherwise, a part of the control capability can be provided there, and either the remaining part, or all of the control capability by paralleling that provided to the rider, can be provided elsewhere, typically to a further operator on the ground, with an appropriate split in the information provided. This last control arrangement is most likely to be used where the platform is an entertainment platform provided to give the user a ride for purposes of entertaining that user. In that situation, some motion control could be available to the user, but stop-and-start control, and perhaps door opening-and-closing control (assuming platform 33 would in such a situation would also be carrying a restraining wall, fence or other similar enclosure or, alternatively, an enclosed or partially enclosed cab), could be kept only with an operator on the ground. Of course, the control capability in this situation could alternatively be provided only to the operator on the ground with a split in the information provided to the rider and the ground operator.

Figure 3:
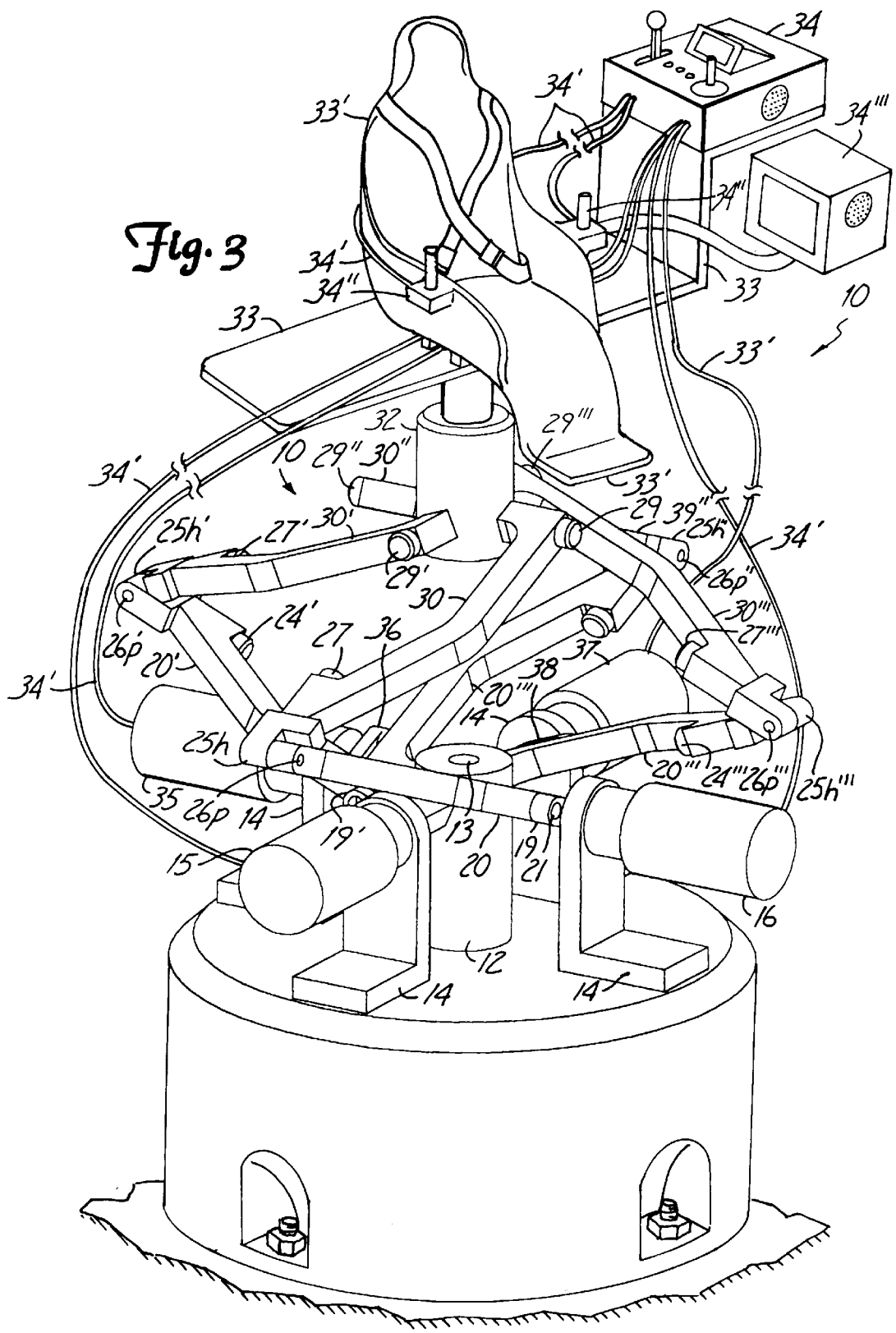
FIGS. 3 and 4 show two perspective views of an alternative embodiment of the present invention.

Rather than having to mount a further mechanical actuator on manipulable support 32 as a basis for providing a member which can be moved outwardly and inwardly with respect to manipulable support 32 along its axis of radial symmetry, and so outwardly and inwardly with respect to manipulable support 12, joint or carrier 10 can be modified to provide that capability directly to support 32 and so to anything mounted thereon. Such a modified joint is shown in FIG. 3 in a perspective view thereof. Two primary modifications have been made to joint or carrier 10 in FIG. 3 with respect to what is shown in FIG. 1 (aside from showing chair 33' also in FIG. 3), these being the provision of a hinge in each of the pivot holder members and the addition of two further actuators to provide all of the lower rotating links with a corresponding actuator capable of rotating the lower pivoting link to which it is connected about the pin or pivot screw or other arrangement rotatably connecting that link to base support 12.

Pivot holder members 25, 25', 25" and 25'" of previous drawings have essentially the same designations for corresponding pivot holder members in FIG. 3 but with the addition of an "h" placed after numerals 25 in each instance to indicate it is a hinged member. The holes 26, 26', 26" and 26'" in the pivot holder members in previous drawings are now each a common hole through both hinge portions of a member having a hinge pin therethrough and so have been redesignated 26p, 26p', 26p", and 26p'" in these figures. A first one of the added actuators, 35, is shown as an electric motor (with again the motor control therefor being built therein but not shown) in a support 14 having a rotating output shaft again connected to a crank arm, 36, which in turn is connected to lower pivoting link 20". A second added actuator, 37, is also an electric motor (again with the motor control therefor being built therein without being shown) that is in a support 14, and has its rotatable output shaft connected to a further crank arm, 38, which is connected to lower pivoting link 20'".

Figure 4:
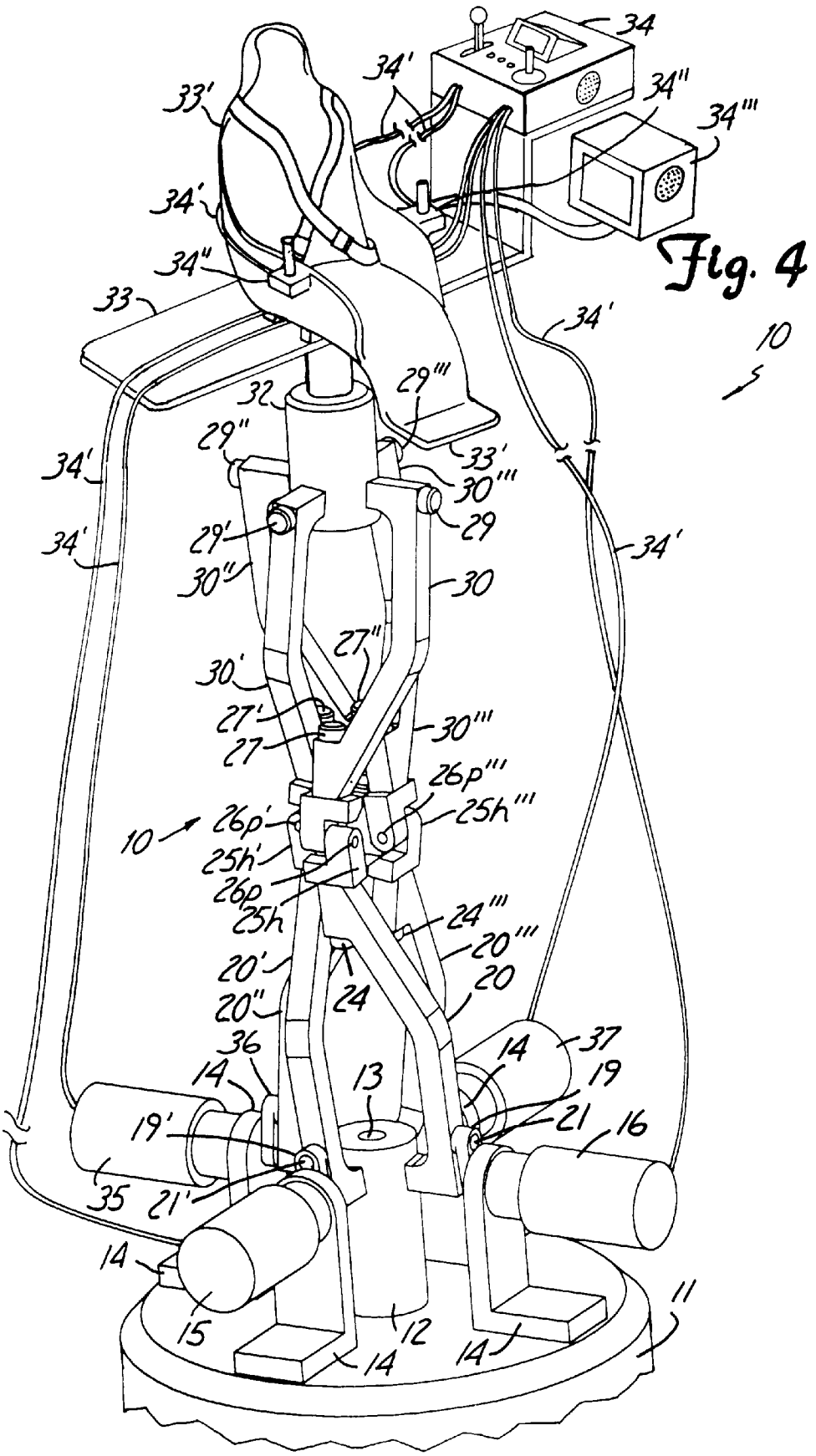

If each of electric control motors 15, 16, 35 and 37 operates its rotatable output shaft in a clockwise direction when looking from the back of a motor toward base support 12, each such rotation will cause the lower pivoting link connected thereto to also rotate in a clockwise direction to lift the opposite end thereof connected to a pivot holder member upward away from base 11 and toward the axis of rotational symmetry of base support 12, i.e. the vertical direction, with the result seen in FIG. 4. In turn, the hinge portion of the pivot holder member rotatably connected to each of these lower pivoting links is forced to rotate in one direction about the hinge pin that rotatably connects it to the other hinge portion of that pivot holder member. The accompanying inward motion of the lower pivoting link end and the connected pivot holder member portion forces the other hinge portion of that member rotatably connected to a corresponding upper pivoting link to rotate in an opposite direction about this hinge pin and forces this latter link upward as the angle between the hinge portions increases. That is, such rotations by these motors of the lower pivoting links that are matched both in angular extent and direction results in moving manipulable support 32 and platform 33 away from base support 12 along the axis of radial symmetry of manipulable support 32. Conversely, if each of these electric motors rotates in a counterclockwise direction to a matched extent, manipulable support 32 and platform 33 will be moved toward base support 12 along the radial axis of symmetry of that support as the angles between the pivot holder member hinge portions decrease.

On the other hand, matched rotations in opposite directions of the members of a pair of motors positioned on opposite sides of base support 12 across from one another, without rotation of the other pair of motors, will result in tilting manipulable support 32 and platform 33 toward the direction the electric motor rotating in a counterclockwise direction is moving the holder connected end of the lower pivoting link connected thereto which will be over one of the nonrotating motors. Adding clockwise rotation to the previously nonrotating motors will allow a significant increase in the tilt angle achieved but will reduce any extension of manipulable support 32 along its axis of radial symmetry at some point because the angle between the hinge portions of the pivot holder members cannot be increased much before interference occurs between the pivot holder members reaching approximately vertical positions.

Matched rotations in opposite directions of the members of both pairs of motors positioned on opposite sides of base support 12 across from one another will result in tilting manipulable support 32 and platform 33 toward a direction halfway between the electric motors in the pairs that are rotating in a counterclockwise direction again with limited extension of manipulable support 32 along its axis of radial symmetry. Such rotations which are unmatched in magnitude will result in tilting manipulable support 32 and platform 33 toward a direction between the electric motors in the pairs that are rotating in a counterclockwise direction that is closer to the one rotates over the larger counterclockwise angle. Of course, combined tilting motions and extension or contraction motions of manipulable support 32 along its axis of radial symmetry can be provided by suitable rotation of the output shafts of these motors in selected directions and amounts.

Although the present invention has been described with reference to preferred embodiments, workers skilled in the art will recognize that changes may be made in form and detail without departing from the spirit and scope of the invention.

What is claimed is:

1. A controlled relative motion system permitting a controlled motion member, joined to a base member, to selectively move with respect to said base member, said system comprising:

a base support;

a first pivot holder comprising at least one holding member;

a first plurality of pivoting links at least one of which is rotatably coupled to said base support so as to be rotatable about a corresponding base link axis and rotatably coupled to said first pivot holder so as to be rotatable about a corresponding holder link axis including at least one of said first plurality of pivoting links being rotatably connected to said first pivot holder holding member, each of said first plurality of pivoting links that is coupled to both said base support and said first pivot holder having said corresponding base link axis thereof extending in a direction differing from that direction in which said corresponding holder link axis thereof extends, each of said first plurality of pivoting links that is coupled to both said base support and said first pivot holder having said corresponding base link axis thereof and said corresponding holder link axis thereof extending in different directions than do said corresponding base link axis and said corresponding holder link axis of any other of said first plurality of pivoting links that is also coupled to both said base support and said first pivot holder;

a first plurality of force imparting members each coupled to either said first pivot holder or one of said pivoting links in said first plurality of pivoting links so as to be able to impart force thereto to cause at least one of those said pivoting links in said first plurality of pivoting links to rotate about an axis therethrough;

a manipulable support having supported thereon a selected one of at least a portion of a control system, capable of directing said first plurality of force imparting members to impart selected forces, or of at least a portion of an information presentation system, capable of providing information in a selected form; and a second plurality of pivoting links each rotatably coupled to said first pivot holder so as to be rotatable about a corresponding holder link axis and each coupled to said manipulable support so as to be rotatable about a corresponding support link axis including at least one of said second plurality of pivoting links being rotatably connected to said first pivot holder holding member as aforesaid, each of said second plurality of pivoting links having said corresponding holder link axis thereof extending in a direction differing from that in which said corresponding support link axis thereof extends, each of said second plurality of pivoting links having said corresponding holder link axis thereof and said corresponding support link axis thereof extending in different directions than do said corresponding holder link axis and said corresponding support link axis of another of said second plurality of pivoting links.

2. The apparatus of claim 1 where one of said first plurality of pivoting links that is coupled to both said base support and said first pivot holder and one of said second plurality of pivoting links each have said base link axis thereof and said holding link axis thereof each oriented substantially perpendicular to planes which intersect one another at substantially right angles.

3. The apparatus of claim 1 wherein each of said pivoting links in said first plurality of pivoting links is coupled to said base support so as to be rotatable about a corresponding base link axis and rotatably coupled to said first pivot holder so as to be rotatable about a corresponding holder link axis, and each of said base link axes of said pivoting links in said first plurality of pivoting links extends along a corresponding radius of a circle having a center within an outer surface envelope of said base support, and each said base link axis being separated from another such axis adjacent thereto by an angle substantially equal to 360° divided by that total number of said pivoting links in said first plurality of pivoting links.

4. The apparatus of claim 1 wherein each of said first plurality of pivoting links that is coupled to both said base support and said first pivot holder has said corresponding base link axis thereof extending in a direction which is noncoplanar with that direction in which said corresponding holder link axis thereof extends.

5. The apparatus of claim 1 wherein each of said first plurality of said pivoting links coupled to said base support is rotatably coupled to said base support through use of a corresponding pin extending between said base support and said pivoting link being coupled thereby and about which pin rotation can occur by at least one of said base support and said pivoting link so coupled.

6. The apparatus of claim 1 wherein at least one of said first plurality of force imparting members provides a rotational motive force.

7. The apparatus of claim 1 wherein both said portion of a control system and said portion of an information presentation system are supported on said manipulable support.

8. The apparatus of claim 2 wherein each of said pivoting links in said first plurality of pivoting links is coupled to said base support so as to be rotatable about a corresponding base link axis and coupled to said first pivot holder so as to be rotatable about a corresponding holder link axis, and each of said base link axes of said pivoting links in said first plurality of pivoting links extends along a corresponding radius of a circle having a center within an outer surface envelope of said base support, and each said base link axis being separated from another such axis adjacent thereto by an angle substantially equal to 360° divided by that total number of said pivoting links in said first plurality of pivoting links.

9. The apparatus of claim 5 wherein at least one of said base support and said pivoting link between which said pin extends is coupled to said pin through a bearing means.

10. The apparatus of claim 5 wherein said pin is part of a shackle.

11. A controlled relative motion system permitting a controlled motion member, joined to a base member, to selectively move with respect to said base member, said system comprising:

a base support;

a first pivot holder comprising at least one holding member;

a first plurality of pivoting links at least one of which is rotatably coupled to said base support so as to be rotatable about a corresponding base link axis and rotatably coupled to said first pivot holder so as to be rotatable about a corresponding holder link axis including at least one of said first plurality of pivoting links being rotatably connected to said first pivot holder holding member, each of said first plurality of pivoting links that is coupled to both said base support and said first pivot holder having said corresponding base link axis thereof extending in a direction differing from that direction in which said corresponding holder link axis thereof extends, each of said first plurality of pivoting links that is coupled to both said base support and said first pivot holder having said corresponding base link axis thereof and said corresponding holder link axis thereof extending in different directions than do said corresponding base link axis and said corresponding holder link axis of any other of said first plurality of pivoting links that is also coupled to both said base support and said first pivot holder;

a first plurality of force imparting members each coupled to either said first pivot holder or one of said pivoting links in said first plurality of pivoting links so as to be able to impart force thereto to cause at least one of those said pivoting links in said first plurality of pivoting links to rotate about an axis therethrough; and said first pivot holder further comprising first pivot holder support having supported thereon a selected one of at least a portion of a control system, capable of directing said first plurality of force imparting members to impart selected forces, or of at least a portion of an information presentation system, capable of providing information in a selected form.

12. The apparatus of claim 11 where one of said first plurality of pivoting links that is coupled to both said base support and said first pivot holder has said base link axis thereof and said holding link axis thereof each oriented substantially perpendicular to planes which intersect one another at substantially right angles.

13. The apparatus of claim 11 wherein each of said pivoting links in said first plurality of pivoting links is coupled to said base support so as to be rotatable about a corresponding base link axis and rotatably coupled to said first pivot holder so as to be rotatable about a corresponding holder link axis, and each of said base link axes of said pivoting links in said first plurality of pivoting links extends along a corresponding radius of a circle having a center within an outer surface envelope of said base support, and each said base link axis being separated from another such axis adjacent thereto by an angle substantially equal to 360° divided by that total number of said pivoting links in said first plurality of pivoting links.

14. The apparatus of claim 11 wherein at least one of said first plurality of force imparting members provides a rotational motive force.

15. The apparatus of claim 11 wherein both said portion of a control system and said portion of an information presentation system are supported on said manipulable support.

16. A controlled relative motion system permitting a controlled motion member, joined to a base member, to selectively move with respect to said base member, said system comprising:

a base support;

a first pivot holder comprising at least one holding member and a first pivot holder support;

a first plurality of pivoting links at least one of which is rotatably coupled to said base support so as to be rotatable about a corresponding base link axis and rotatably coupled to said first pivot holder so as to be rotatable about a corresponding holder link axis including at least one of said first plurality of pivoting links being rotatably connected to said first pivot holder holding member, each of said first plurality of pivoting links that is coupled to both said base support and said first pivot holder having said corresponding base link axis thereof extending in a direction differing from that direction in which said corresponding holder link axis thereof extends, each of said first plurality of pivoting links that is coupled to both said base support and said first pivot holder having said corresponding base link axis thereof and said corresponding holder link axis thereof extending in different directions than do said corresponding base link axis and said corresponding holder link axis of any other of said first plurality of pivoting links that is also coupled to both said base support and said first pivot holder;

a first plurality of force imparting members each coupled to either said first pivot holder or one of said pivoting links in said first plurality of pivoting links so as to be able to impart force thereto to cause at least one of those said pivoting links in said first plurality of pivoting links to rotate about an axis therethrough;

a second pivot holder comprising at least one holding member;

a second plurality of pivoting links each rotatably coupled to said first pivot holder support so as to be rotatable about a corresponding support link axis and each rotatably coupled to said second pivot holder so as to be rotatable about a corresponding holder link axis including at least one of said second plurality of pivoting links being rotatably connected to said second pivot holder holding member, each of said second plurality of pivoting links having said corresponding support link axis thereof extending in a direction differing from that in which said corresponding holder link axis thereof extends, each of said second plurality of pivoting links having said corresponding support link axis thereof and said corresponding holder link axis thereof extending in different directions than do said corresponding support link axis and said corresponding holder link axis of another of said second plurality of pivoting links;

a second plurality of force imparting members each coupled to either said second pivot holder or one of said pivoting links in said second plurality of pivoting links so as to be able to impart force thereto to cause at least one of those said pivoting links in said second plurality of pivoting links to rotate about an axis therethrough; and said second pivot holder further comprising second pivot holder support having supported thereon a selected one of at least a portion of a control system, capable of directing said first plurality of force imparting members to impart selected forces, or of at least a portion of an information presentation system, capable of providing information in a selected form.

17. The apparatus of claim 16 wherein each of said second plurality of force imparting members is also coupled to said first pivot holder support.

18. The apparatus of claim 16 wherein both said portion of a control system and said portion of an information presentation system are supported on said manipulable support.

19. The apparatus of claim 17 wherein at least one of each of said first and second pluralities of force imparting members provides a rotational motive force.

20. A mechanical joint permitting a controlled motion output member, joined to an initial member, to move with respect to said initial member, said system comprising:

a base support;

a first pivot holder comprising at least four holding members;

a first group of pivoting links each rotatably coupled to said base support so as to be rotatable about a corresponding base link axis and each rotatably coupled to said first pivot holder so as to be rotatable about a corresponding holder link axis with said first group of pivoting links including at least four of said pivoting links each rotatably connected to a corresponding one of said four first pivot holder holding members, each of said first group of pivoting links having said corresponding base link axis thereof extending in a direction differing from that in which said corresponding holder link axis thereof extends, each of said first group of pivoting links having said corresponding base link axis thereof and said corresponding holder link axis thereof extending in different directions than do said corresponding base link axis and said corresponding holder link axis of another of said first group of pivoting links;

a first plurality of force imparting members each coupled to either said first pivot holder or one of said pivoting links in said first plurality of pivoting links so as to be able to impart force thereto to cause at least one of those said pivoting links in said first plurality of pivoting links to rotate about an axis therethrough;

a manipulable support having supported thereon a selected one of at least a portion of a control system, capable of directing said first plurality of force imparting members to impart selected forces, or of at least a portion of an information presentation system, capable of providing information in a selected form; and a second group of pivoting links of at least four in number each rotatably coupled to said first pivot holder so as to be rotatable about a corresponding holder link axis, including at least each of said four of said second group of pivoting links being rotatably connected to a corresponding one of said four first pivot holder holding members, and each rotatably coupled to said manipulable support so as to be rotatable about a corresponding support link axis, each of said second group of pivoting links having said corresponding holder link axis thereof extending in a direction differing from that in which said corresponding support link axis thereof extends, each of said second group of pivoting links having said corresponding holder link axis thereof and said corresponding support link axis thereof extending in different directions than do said corresponding holder link axis and said corresponding support link axis of another of said second group of pivoting links.

21. The apparatus of claim 20 where one of said first group of pivoting links and one of said second group of pivoting links each have said base link axis thereof and said holding link axis thereof each oriented substantially perpendicular to planes which intersect one another at substantially right angles.

22. The apparatus of claim 20 wherein each of said base link axes of said pivoting links in said first group of pivoting links extends along a corresponding radius of a circle having a center within an outer surface envelope of said base member, and each said base link axis being separated from another such axis adjacent thereto by an angle substantially equal to 360° divided by that total number of said pivoting links in said first group of pivoting links.

23. The apparatus of claim 20 wherein each of said first group of said pivoting links is rotatably coupled to said base support through use of a corresponding pin extending between said base support and said pivoting link being coupled thereby, and about which pin rotation can occur by at least one of said base support and said pivoting link so coupled.

24. The apparatus of claim 20 wherein both said portion of a control system and said portion of an information presentation system are supported on said manipulable support.

25. The apparatus of claim 20 wherein at least one of said first plurality of force imparting members provides a rotational motive force.

26. A controlled relative motion system permitting a controlled motion member, joined to a base member, to selectively move with respect to said base member, said system comprising:

a base support;

a plurality of force imparting means coupled to said base support;

a first pivot holder comprising at least one holding member;

a first plurality of pivoting links at least one of which is rotatably coupled to a corresponding said force imparting means that can impart force thereto so as to be rotatable about a corresponding base link axis and rotatably coupled to said first pivot holder so as to be rotatable about a corresponding holder link axis including at least one of said first plurality of pivoting links being rotatably connected to said first pivot holder holding member, each of said first plurality of pivoting links that is coupled to both a said force imparting means and said first pivot holder having said corresponding base link axis thereof extending in a direction differing from that direction in which said corresponding holder link axis thereof extends, each of said first plurality of pivoting links that is coupled to both a said force imparting means and said first pivot holder having said corresponding base link axis thereof and said corresponding holder link axis thereof extending in different directions than do said corresponding base link axis and said corresponding holder link axis of any other of said first plurality of pivoting links that is also coupled to both a said force imparting means and said first pivot holder;

a manipulable support having supported thereon a selected one of at least a portion of a control system, capable of directing said first plurality of force imparting members to impart selected forces, or of at least a portion of an information presentation system, capable of providing information in a selected form; and a second plurality of pivoting links each rotatably coupled to said first pivot holder so as to be rotatable about a corresponding holder link axis and each rotatably coupled to said manipulable support so as to be rotatable about a corresponding support link axis including at least one of said second plurality of pivoting links being rotatably connected to said first pivot holder holding member, each of said second plurality of pivoting links having said corresponding holder link axis thereof extending in a direction differing from that in which said corresponding support link axis thereof extends, each of said second plurality of pivoting links having said corresponding holder link axis thereof and said corresponding support link axis thereof extending in different directions than do said corresponding holder link axis and said corresponding support link axis of another of said second plurality of pivoting links.

27. The apparatus of claim 26 where one of said first plurality of pivoting links that is coupled to both a corresponding one of said force imparting means and said first pivot holder and one of said second group of pivoting links each have said base link axis thereof and said holding link axis thereof each oriented substantially perpendicular to planes which intersect one another at substantially right angles.

28. The apparatus of claim 26 wherein each of said first plurality of pivoting links that is coupled to both a corresponding one of said force imparting means and said first pivot holder has said corresponding base link axis thereof extending in a direction which is noncoplanar with that direction in which said corresponding holder link axis thereof extends.

29. The apparatus of claim 26 wherein each of said pivoting links in said first plurality of pivoting links is coupled to said base support so as to be rotatable about a corresponding base link axis and rotatably coupled to said first pivot holder so as to be rotatable about a corresponding holder link axis, and each of said base link axes of said pivoting links in said first plurality of pivoting links extends along a corresponding radius of a circle having a center within an outer surface envelope of said base support, and each said base link axis being separated from another such axis adjacent thereto by an angle substantially equal to 360° divided by that total number of said pivoting links in said first plurality of pivoting links.

30. The apparatus of claim 26 wherein at least one of said pivoting links in said first plurality of pivoting links is coupled to said first base support so as to be rotatable about a corresponding base link axis, and each of said first plurality of said pivoting links coupled to said base support is rotatably coupled to said base support through use of a corresponding pin extending between said base support and said pivoting link being coupled thereby and about which pin rotation can occur by at least one of said base support and said pivoting link so coupled.

31. The apparatus of claim 26 wherein both said portion of a control system and said portion of an information presentation system are supported on said manipulable support.

32. The apparatus of claim 26 wherein at least one of said first plurality of force imparting members provides a rotational motive force.

33. A controlled relative motion system permitting a controlled motion member, joined to another base member, to selectively move with respect to that base member, said system comprising:

a base support;

a first pivot holder comprising at least one holding member having a first portion thereof rotatably connected to a second portion thereof;

a first plurality of pivoting links at least one of which is rotatably coupled to said base support so as to be rotatable about a corresponding base link axis and rotatably coupled to said first pivot holder so as to be rotatable about a corresponding holder link axis including at least one of said first plurality of pivoting links being rotatably connected to said first pivot holder holding member first portion, each of said first plurality of pivoting links that is coupled to both said base support and said first pivot holder having said corresponding base link axis thereof extending in a direction differing from that direction in which said corresponding holder link axis thereof extends, each of said first plurality of pivoting links that is coupled to both said base support and said first pivot holder having said corresponding base link axis thereof and said corresponding holder link axis thereof extending in different directions than do said corresponding base link axis and said corresponding holder link axis of any other of said first plurality of pivoting links that is also coupled to both said base support and said first pivot holder;

a first plurality of force imparting members each coupled to either said first pivot holder or one of said pivoting links in said first plurality of pivoting links so as to be able to impart force thereto to cause at least one of those said pivoting links in said first plurality of pivoting links to rotate about an axis therethrough;

a manipulable support having supported thereon a selected one of at least a portion of a control system, capable of directing said first plurality of force imparting members to impart selected forces, or of at least a portion of an information presentation system, capable of providing information in a selected form; and a second plurality of pivoting links each rotatably coupled to said first pivot holder so as to be rotatable about a corresponding holder link axis and each coupled to said manipulable support so as to be rotatable about a corresponding support link axis including at least one of said second plurality of pivoting links being rotatably connected to said first pivot holder holding member second portion as aforesaid, each of said second plurality of pivoting links having said corresponding holder link axis thereof extending in a direction differing from that in which said corresponding support link axis thereof extends, each of said second plurality of pivoting links having said corresponding holder link axis thereof and said corresponding support link axis thereof extending in different directions than do said corresponding holder link axis and said corresponding support link axis of another of said second plurality of pivoting links.

34. The apparatus of claim 33 where one of said first plurality of pivoting links that is coupled to both said base support and said first pivot holder and one of said second group of pivoting links each have said base link axis thereof and said holding link axis thereof each oriented substantially perpendicular to planes which intersect one another at substantially right angles.

35. The apparatus of claim 33 wherein each of said pivoting links in said first plurality of pivoting links is coupled to said base support so as to be rotatable about a corresponding base link axis and rotatably coupled to said first pivot holder so as to be rotatable about a corresponding holder link axis, and each of said base link axes of said pivoting links in said first plurality of pivoting links extends along a corresponding radius of a circle having a center within an outer surface envelope of said base support, and each said base link axis being separated from another such axis adjacent thereto by an angle substantially equal to 360° divided by that total number of said pivoting links in said first plurality of pivoting links.

36. The apparatus of claim 33 wherein each of said first plurality of said pivoting links coupled to said base support is rotatably coupled to said base support through use of a corresponding pin extending between said base support and said pivoting link being coupled thereby and about which pin rotation can occur by at least one of said base support and said pivoting link so coupled.

37. The apparatus of claim 33 wherein each of said first plurality of pivoting links that is coupled to both said base support and said first pivot holder has said corresponding base link axis thereof extending in a direction which is noncoplanar with that direction in which said corresponding holder link axis thereof extends.

38. The apparatus of claim 33 wherein at least one of said first plurality of force imparting members provides a rotational motive force.

39. The apparatus of claim 33 wherein both said portion of a control system and said portion of an information presentation system are supported on said manipulable support.

40. A controlled relative motion system permitting a controlled motion member, joined to a base member, to selectively move with respect to said base member, said system comprising:

a base support;

a plurality of force imparting means coupled to said base support;

a first pivot holder comprising at least one holding member having a first portion thereof rotatably connected to a second portion thereof;

a first plurality of pivoting links at least one of which is rotatably coupled to a corresponding said force imparting means that can impart force thereto so as to be rotatable about a corresponding base link axis and rotatably coupled to said first pivot holder so as to be rotatable about a corresponding holder link axis including at least one of said first plurality of pivoting links being rotatably connected to said first pivot holder holding member first portion, each of said first plurality of pivoting links that is coupled to both a said force imparting means and said first pivot holder having said corresponding base link axis thereof extending in a direction differing from that direction in which said corresponding holder link axis thereof extends, each of said first plurality of pivoting links that is coupled to both a said force imparting means and said first pivot holder having said corresponding base link axis thereof and said corresponding holder link axis thereof extending in different directions than do said corresponding base link axis and said corresponding holder link axis of any other of said first plurality of pivoting links that is also coupled to both a said force imparting means and said first pivot holder;

a manipulable support having supported thereon a selected one of at least a portion of a control system, capable of directing said first plurality of force imparting members to impart selected forces, or of at least a portion of an information presentation system, capable of providing information in a selected form; and a second plurality of pivoting links each rotatably coupled to said first pivot holder so as to be rotatable about a corresponding holder link axis and each rotatably coupled to said manipulable support so as to be rotatable about a corresponding support link axis including at least one of said second plurality of pivoting links being rotatably connected to said first pivot holder holding member second portion, each of said second plurality of pivoting links having said corresponding holder link axis thereof extending in a direction differing from that in which said corresponding support link axis thereof extends, each of said second plurality of pivoting links having said corresponding holder link axis thereof and said corresponding support link axis thereof extending in different directions than do said corresponding holder link axis and said corresponding support link axis of another of said second plurality of pivoting links.

41. The apparatus of claim 40 where one of said first plurality of pivoting links that is coupled to both a corresponding one of said force imparting means and said first pivot holder and one of said second group of pivoting links each have said base link axis thereof and said holding link axis thereof each oriented substantially perpendicular to planes which intersect one another at substantially right angles.

42. The apparatus of claim 40 wherein each of said first plurality of pivoting links that is coupled to both a corresponding one of said force imparting means and said first pivot holder has said corresponding base link axis thereof extending in a direction which is noncoplanar with that direction in which said corresponding holder link axis thereof extends.

43. The apparatus of claim 40 wherein each of said pivoting links in said first plurality of pivoting links is coupled to said base support so as to be rotatable about a corresponding base link axis and rotatably coupled to said first pivot holder so as to be rotatable about a corresponding holder link axis, and each of said base link axes of said pivoting links in said first plurality of pivoting links extends along a corresponding radius of a circle having a center within an outer surface envelope of said base support, and each said base link axis being separated from another such axis adjacent thereto by an angle substantially equal to 360° divided by that total number of said pivoting links in said first plurality of pivoting links.

44. The apparatus of claim 40 wherein at least one of said pivoting links in said first plurality of pivoting links is coupled to said first base support so as to be rotatable about a corresponding base link axis, and each of said first plurality of said pivoting links coupled to said base support is rotatably coupled to said base support through use of a corresponding pin extending between said base support and said pivoting link being coupled thereby and about which pin rotation can occur by at least one of said base support and said pivoting link so coupled.

45. The apparatus of claim 40 wherein at least one of said first plurality of force imparting members provides a rotational motive force.

46. The apparatus of claim 40 wherein both said portion of a control system and said portion of an information presentation system are supported on said manipulable support.

* * * * *